UNITED STATES PATENT OFFICE.

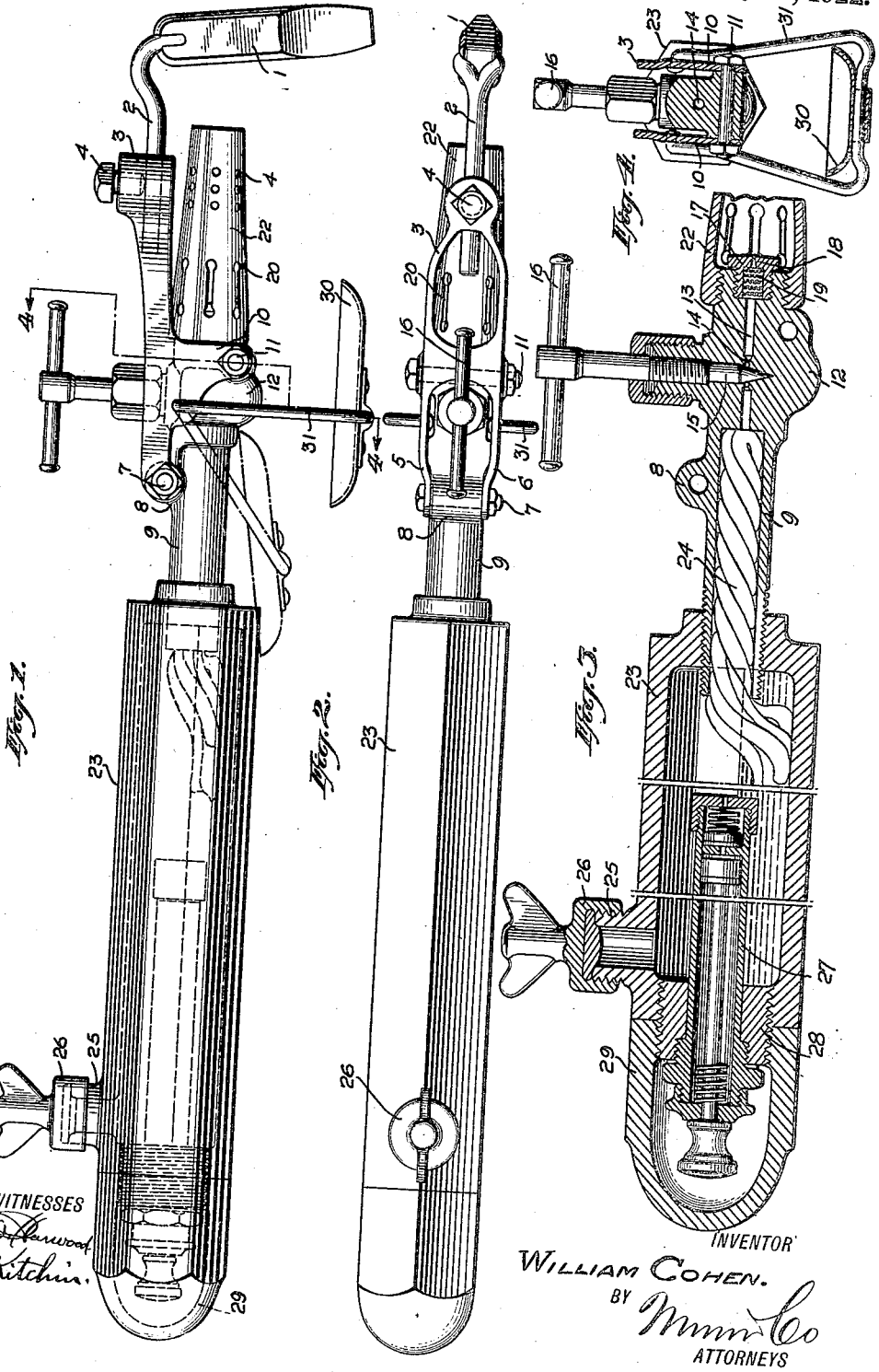

WILLIAM COHEN, OF BAYONNE, NEW JERSEY.

GASOLINE SOLDERING IRON.

1,422,740. Specification of Letters Patent. Patented July 11, 1922.

Application filed January 14, 1921. Serial No. 437,242.

*To all whom it may concern:*

Be it known that I, WILLIAM COHEN, a citizen of the United States, and a resident of Bayonne, in the county of Hudson and State of New Jersey, have invented a new and Improved Gasoline Soldering Iron, of which the following is a full, clear, and exact description.

This invention relates to soldering irons and has for an object to provide an improved construction wherein the iron is maintained continuously heated through the action of a flame.

Another object of the invention is to provide a soldering iron in which a reservoir, a torch and connecting parts are provided for maintaining the flame on or adjacent the head of the iron.

Another object of the invention is to provide a soldering iron in which the head is heated from a torch, the arrangement being such that any desired pressure of fuel on the torch may be secured and substantially any desired flame provided.

An additional object is to provide a self-heating soldering iron in which the reservoir acts as a handle for the head of the iron.

In the accompanying drawings—
Figure 1 is a side view of the complete soldering iron disclosing an embodiment of the invention.

Figure 2 is a top plan view of the structure shown in Figure 1.

Figure 3 is a longitudinal vertical section through Figure 1 from one end to near the opposite end, the same being on an enlarged scale.

Figure 4 is a sectional view through Figure 1 on line 4—4.

Referring to the accompanying drawings by numeral, 1 indicates a soldering iron per se or head 2 and a shank therefor slidingly positioned in a suitable aperture in the frame 3. A set screw 4 is provided for locking the shank 2 in any desired position. The frame 3 is bifurcated and formed with rearwardly extending arms 5 and 6 pivotally mounted at 7 on a pin extending through an enlargement 8 formed on the tube 9. The frame 3 is also provided with integral extensions 10 pivotally mounted by a suitable pin 11 on the lower part of the enlargement 12 of tube 9. Enlargement 12 is provided with a small passage-way 13 expanded at its outer end into a shouldered and internally threaded counter-bore and merging into an inlet opening 14 adapted to be closed by a valve 15 which is operated by a suitable handle 16. A nozzle 17 is threaded into the counter-bore of enlargement 12 in line with the passage-way 13, said nozzle being provided with a restricted opening 18 and a plurality of straining members 19 formed of suitable material, as for instance, fine wire mesh, these being held against the shoulder of the counterbore by nozzle 17. The gasified or vaporized gasoline passes through the opening 18 at a comparatively high speed in a small jet and is mixed with air passing through the various openings 20 and 21 in the nozzle 22 which is threaded onto the nozzle 12 and formed with an extension to the pipe 9. This mixture of air and vaporized gasoline when ignited produces a very hot flame which is projected from the end of the nozzle 22 into the immediate proximity or against the head 1 whereby said head is maintained heated.

It will be noted that the heat is applied to the head at a point distant from the point of contact of the head with the work being soldered. This prevents the head from removing the tinning on the head. As shown in the drawing the head 1 is almost at right angles to the nozzle 22 but it could be substantially parallel therewith if desired or at some other angle from that shown and would receive ample heat when the parts have been properly adjusted.

The tube 9 is threaded into a container or tank 23 which acts also as a handle, said container being of any material but preferably of aluminum for the sake of lightness. If desired, a wick 24 could be arranged in the tube 9 to prevent too large a supply of gasoline at the point of ignition. The container 23 is provided with a threaded boss 25 which is formed with an aperture communicating with the interior of the container whereby gasoline or other proper fuel may be inserted at any time and then the cap 26 screwed on tight. A pump 27 of a suitable construction is provided for supplying ample air pressure to the tank 23, said pump being held in place by being threaded into a sleeve 28, which sleeve is in turn threaded into the end of the container 23. If the container 23 is of aluminum the sleeve 28 should be of brass or some other metal which would quickly take a good thread and onto which the cap 29 might easily be screwed. As this cap is removed each time the pump is operated, it is desirable to have a good thread provided.

In operation, when it is desired to use the tool a supply of gasoline is provided in the container 23 and cap 26 is tightened. Cap 29 is removed and pump 27 operated until the desired pressure is secured. Some gasoline, alcohol or other fuel is then supplied to the pan 30 and ignited whereupon the enlargement 12, nozzle 22 and associated parts are heated sufficiently to gasify the gasoline forced therein. The pan 30 is pivotally mounted on a bale 31, which in turn is pivotally mounted on the frame 3 and acts not only in the capacity of means for receiving liquid for starting the action of the burner but also may act as a support when the burner is not in use.

It will be understood that after the parts have been heated as just described, the flame produced in the nozzle 22 will maintain the parts in a sufficiently heated condition to maintain a continuous vaporization and gasifying of the gasoline. In case the flame should not be of the desired length or intensity pump 27 is operated until sufficient pressure is provided for forcing a sufficient quantity of gasoline through the discharge opening 18 to secure the desired result. Cap 29 is then replaced and the iron is in condition for use. By manipulating the handle 16, valve 15 can be opened and closed and, consequently, the heat regulated so as to maintain the head 1 continuously at the proper temperature.

What I claim is:—

In a soldering iron a soldering head, a burner for heating said head, a frame carrying said head and mounted on said burner, a liquid fuel tank for supplying fuel to said burner, said tank having an open rear end, a sleeve having a continuous external thread and an internally threaded neck portion arranged in said open rear end, a hollow cap having a rounded end and threaded on said sleeve so as to cover the same and enclose part of the sleeve, the outer surface of the cap being flush with that of the container and said cap acting as a continuation or end piece to the container, and an air pump threaded into the neck of said sleeve with the discharge end extending into the container, and the manually operated end normally projecting into said cap and housed thereby.

WILLIAM COHEN.